US008037307B2

(12) United States Patent
Irwin, Jr.

(10) Patent No.: US 8,037,307 B2
(45) Date of Patent: Oct. 11, 2011

(54) SYSTEM AND METHOD FOR SECURING ON-LINE DOCUMENTS USING AUTHENTICATION CODES

(75) Inventor: Kenneth E. Irwin, Jr., Dawsonville, GA (US)

(73) Assignee: Scientific Games International Inc., Newwark, DE (US)

( * ) Notice: Subject to any disclaimer, the term of this patent is extended or adjusted under 35 U.S.C. 154(b) by 982 days.

(21) Appl. No.: 11/482,465

(22) Filed: Jul. 7, 2006

(65) Prior Publication Data

US 2007/0113280 A1 May 17, 2007

Related U.S. Application Data

(63) Continuation-in-part of application No. 11/039,748, filed on Jan. 19, 2005, now Pat. No. 7,788,482.

(60) Provisional application No. 60/569,773, filed on May 10, 2004.

(51) Int. Cl.
*H04L 9/32* (2006.01)
*G06F 7/04* (2006.01)
*G06F 17/30* (2006.01)
*H04L 29/06* (2006.01)

(52) U.S. Cl. ............... 713/173; 726/6; 380/51; 380/251; 379/93.13; 463/17; 283/903; 902/22; 902/23; 273/139; 273/269

(58) Field of Classification Search .................... 380/51, 380/251; 726/6; 713/173; 379/93.13; 463/17; 283/903; 273/139, 269; 902/22, 23
See application file for complete search history.

(56) References Cited

U.S. PATENT DOCUMENTS

| 4,842,278 | A | 6/1989 | Markowicz |
| 4,922,522 | A | 5/1990 | Scanlon |
| 5,119,295 | A | 6/1992 | Kapur |
| 5,420,406 | A | 5/1995 | Izawa et al. |
| 5,667,250 | A | 9/1997 | Behm et al. |
| 5,769,458 | A | 6/1998 | Carides et al. |
| 5,791,990 | A | 8/1998 | Schroeder et al. |

(Continued)

FOREIGN PATENT DOCUMENTS

JP 2005 071245 3/2005

OTHER PUBLICATIONS

Schneier, "Applied Cryptography: Protocols, Algorithms, and Source Code in C", 1996, John Wiley & Sons, Inc., Second Edition, pp. 4, 30.*

(Continued)

*Primary Examiner* — Michael Simitoski
(74) *Attorney, Agent, or Firm* — Dority & Manning, P.A.

(57) ABSTRACT

A system and method for providing an authentication code across a network for use in authentication of documents, such as printed lottery tickets. The system includes document-printing terminals that include a key that is used in a mathematical function with the bet information for a specific-game entry to generate a document code that is sent to a central server. The central server stores the received document code and then generates an authentication code for the document desired to be printed at the terminal, and sends the authentication code back to the terminal for printing on the issued document. The authentication code can be a further mathematical processing of the document code. Verification of the document occurs from comparison of the authentication code on the document and stored authentication and/or document codes at the server.

20 Claims, 4 Drawing Sheets

U.S. PATENT DOCUMENTS

| | | | |
|---|---|---|---|
| 5,863,075 A | 1/1999 | Rich et al. | |
| 6,107,913 A | 8/2000 | Gatto et al. | |
| 6,170,744 B1 | 1/2001 | Lee et al. | |
| 6,267,670 B1 * | 7/2001 | Walker et al. | 463/17 |
| 6,322,446 B1 | 11/2001 | Yacenda | |
| 6,327,656 B2 | 12/2001 | Zabetian | |
| 6,402,614 B1 | 6/2002 | Schneier et al. | |
| 6,552,290 B1 | 4/2003 | Lawandy | |
| 6,557,759 B1 | 5/2003 | Zolotarev et al. | |
| 6,602,138 B2 | 8/2003 | Nulph | |
| 6,685,562 B1 | 2/2004 | Rantanen | |
| 6,817,515 B2 * | 11/2004 | Winnett | 235/51 |
| 6,875,105 B1 | 4/2005 | Behm et al. | |
| 6,899,621 B2 | 5/2005 | Behm | |
| 6,918,038 B1 | 7/2005 | Smith et al. | |
| 6,944,770 B2 | 9/2005 | Henderson et al. | |
| 7,069,250 B2 | 6/2006 | Meadow et al. | |
| 2002/0067827 A1 | 6/2002 | Kargman | |
| 2002/0084327 A1 | 7/2002 | Ehrhart et al. | |
| 2004/0053011 A1 | 3/2004 | Behm et al. | |
| 2004/0054678 A1 | 3/2004 | Okamoto et al. | |
| 2004/0056416 A1 | 3/2004 | Bennett, III | |
| 2004/0076310 A1 | 4/2004 | Hersch et al. | |
| 2004/0127279 A1 | 7/2004 | Gatto et al. | |
| 2004/0128395 A1 | 7/2004 | Miyazaki | |
| 2005/0003884 A1 | 1/2005 | Meyer et al. | |
| 2005/0038756 A1 * | 2/2005 | Nagel | 705/76 |
| 2005/0133584 A1 | 6/2005 | Finnerty et al. | |
| 2005/0163549 A1 | 7/2005 | Shima et al. | |
| 2007/0088953 A1 * | 4/2007 | Hilton et al. | 713/176 |

OTHER PUBLICATIONS

Schneier, "Applied Cryptography: Protocols, Algorithms, and Source Code in C" Second Edition, Wiley and Sons. pp. 173 and 455. 1996.*

Garg, Rahul et al. "An Architecture for Secure Generation and Verification of Electronic Coupons", 2001.*

PCT Search Report, Aug. 6, 2008.

* cited by examiner

SYSTEM AND METHOD FOR SECURING ON-LINE DOCUMENTS USING AUTHENTICATION CODES

CROSS-REFERENCE TO RELATED APPLICATION

This application is a continuation-in-part of U.S. patent application Ser. No. 11/039,748, filed on Jan. 19, 2005, now U.S. Pat. No. 7,788,482 which claims the benefit of U.S. Provisional Patent Application Ser. No. 60/569,773, filed May 10, 2004, the entirety of which are hereby incorporated herein by this reference.

BACKGROUND OF THE INVENTION

1. Field of the Invention

The present invention generally relates to methods of document verification. More particularly, the present invention relates to a system and method of providing authentication codes over a network to embed in or print on documents for verification and authentication purposes.

2. Description of the Related Art

There are several methods known to embed security measures into a document to help prove that the document is authentic. The most basic methods are to impose or emboss a visible seal on the document. It is also known to use a watermark or a ribbon in the substrate of the document, or use color shifting ink, all of which are readily visible to a person viewing the document. There are other methods to maintain document authenticity which are not readily visible to a viewer, such as microprinting, or the use of heat or light sensitive ink.

One particularly important area for document authentication concerns lottery tickets. In most instances, mere possession of a winning lottery ticket entitles the holder to the winnings. Thus, authentication of the presented lottery ticket is critically important. For example, lottery on-line tickets which are common in many countries and states are, by necessity, printed and presented to the purchaser in real-time with transactional data printed on the lottery ticket via a thermal or impact printer. To enhance security, lotteries typically use preprinted ticket stock with serial numbering on the back of the printing substrate as well as fluorescent and other inks on the ticket substrate to help prove authenticity and integrity. The preprinted serial numbering provides much of the security in determining the authenticity of a winning ticket because the distribution of the preprinted serial number ticket stock is maintained by an entity separate from the one controlling the printing of transactional data. When a winning ticket is presented for redemption, an audit trail can be established between the ticket stock serial number and the transactional data.

However, this added paper stock security has the disadvantage of high cost, as well as the logistics of tracking the ticket stock. Also, the labor intensive nature of correlating the ticket stock to an on-line lottery ticket printed at a given retailer at a given time typically prohibits the method's use for all but high-tier winning tickets. Finally, it may be possible for an insider with access to the system controlling the printing of transactional data to simply purchase a Lottery ticket from a retailer shortly after it was determined that that a high tier winner was sold at that location to thereby gain illicit knowledge of the appropriate ticket stock serial number range.

A second tier of defense can be added to on-line ticket security through either encrypting the ticket-provider transactional database or the printed ticket serial numbers. This encryption stops readily discernable correlation between the ticket provider database, which contains the listing of winning tickets, and the actual on-line ticket serial numbers printed in the field. Such action prevents an insider with access to the winning database from being able to counterfeit winning ticket serial numbers. Further, the encryption technique has the advantage of securing both high and low tier redemptions as opposed to logistical limitations limiting ticket stock serial number validation to high tier fraud. However, this method of on-line serial number encryption relies upon the encryption keys being unknown to insiders. Also, on-line serial number encryption creates a processing burden on all sales transactions at the ticket-provider and has the possibility of locking-out all legitimate redemptions if the secret encryption/decryption key(s) become lost.

Accordingly, it would be advantageous to provide a method to allow verification for remotely printed documents that does not rely upon preprinted substrate. Further, especially regarding on-line lottery tickets, such method should allow the verification and authentication of all printed documents with minimal cost in doing so. It is thus to a novel system and method for providing authentication codes across a network for use on documents that the present invention is primarily directed.

SUMMARY OF THE INVENTION

The present invention is a system and method for providing an authentication code across a network for use in authentication of documents, such as on-line printed lottery tickets. The use of an authentication code printed on the lottery tickets protects against both counterfeiting and insider attacks. In one embodiment, the invention is a system for providing an authentication code across a network for use in a game-entry document, comprising one or more terminals that each include a document printing device, with each terminal including a key and selectively receiving a bet for entry into a game and generating a game-entry document having document specific information, and each terminal further generating a document code comprised of a mathematical function utilizing at least the key and a bet for a specific game entry and selectively transmitting the document specific information and document code to another computer device on the network. The system includes at least one server in communication with the network that receives the document-specific information and document code transmitted from the one or more terminals, stores such document-specific information and code, and sends the one or more terminals at least an authentication code for printing on a game-entry document. Upon receipt of the authentication code from the at least one server, each terminal prints a game-entry document including the received authentication code. Verification of the document can then occur from comparison of the authentication code on the document and stored document codes at the server.

In another embodiment, the invention is a method of providing an authentication code across a network for use in the verification of a game-entry document, including the steps of receiving at a server document-specific information and a document code transmitted from a terminal across a network, wherein the terminal includes a key and selectively receives a bet for entry into a game and selectively generates a game-entry document having document-specific information, with the terminal further generating a document code comprised of a mathematical function utilizing at least the key and a bet for a specific game entry and transmitting the document-specific information and document code to another computer device on the network. Then the method includes the step of storing such document-specific information and document code at the server, and generating an authentication code based upon the received document-specific information and document code, and then sending to the one or more terminals, at least, the authentication code for generation of a game-entry document.

In yet another embodiment, the invention includes a computer device for generating game-entry documents, having a document printing device, a communication interface with a network, and a controller that includes a key and selectively receives a bet for entry into a game and selectively generating a game-entry document having document-specific information, the controller further generating a document code comprised of a mathematical function utilizing at least the key and a bet for a specific game entry, and the controller selectively transmits the document specific information and document code to another computer device on the network, such as a central server, and the controller selectively receives an authentication code for printing on the ticket.

The present invention accordingly provides an advantage as it allows verification for remotely printed documents, such as lottery tickets, without the use of preprinted substrate. The process can be done electronically to minimize the cost such that any document can be economically authenticated. In fact, in particular regard to on-line lottery tickets, the present invention can mitigate the need for preprinted serial number paper stock and encryption of the ticket-provider generated on-line ticket serial numbers as the authentication codes and usage of key-based encryption is more secure than those methods.

Other objects, advantages and features of the present invention will become apparent after review of the hereinafter set forth Brief Description of the Drawings, Detailed Description of the Invention, and the Claims.

DETAILED DESCRIPTION OF THE INVENTION

Figure 1:
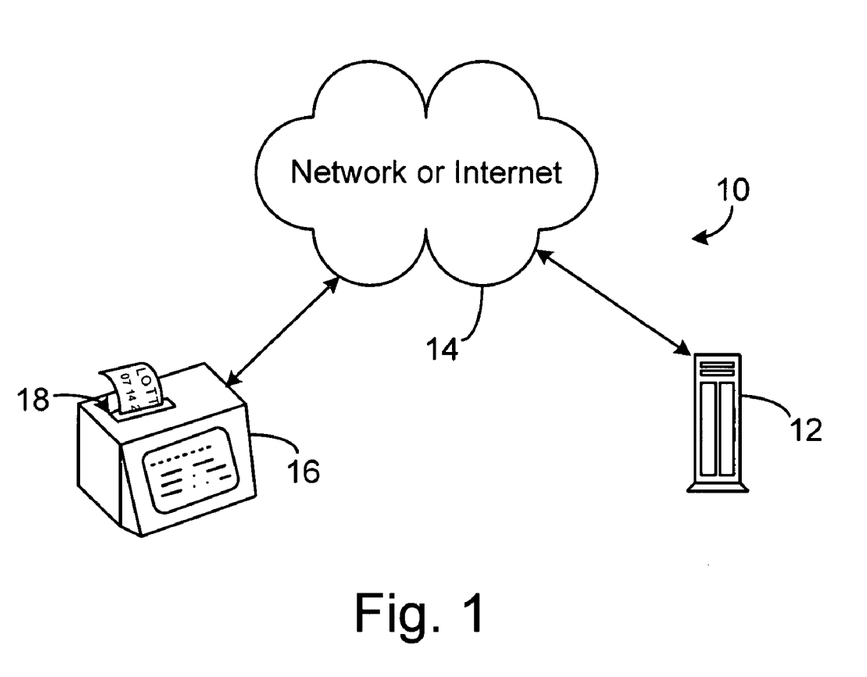
FIG. 1 is a diagram of the system of providing authentication codes to printed on-line lottery tickets with a key to the authentication code being transmitted to a server across a network.
Figure 2A:
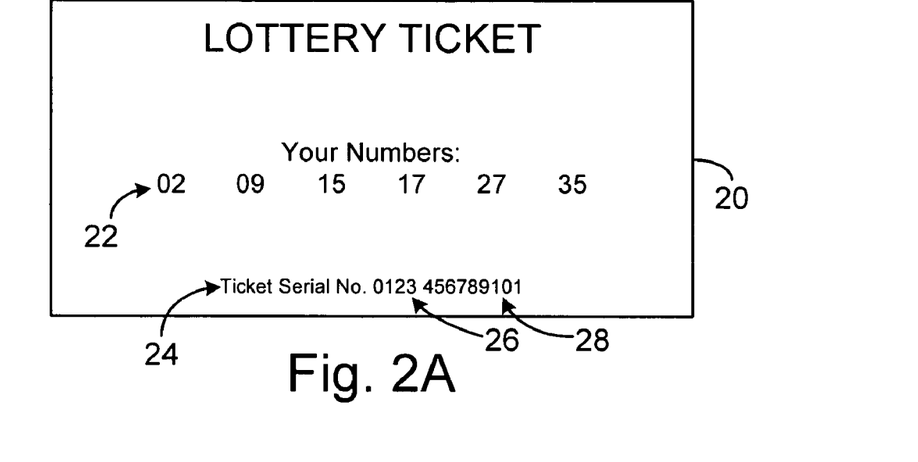
FIG. 2A is a printed on-line lottery ticket illustrating a standard serial number as provided by the central lottery site.
Figure 2B:
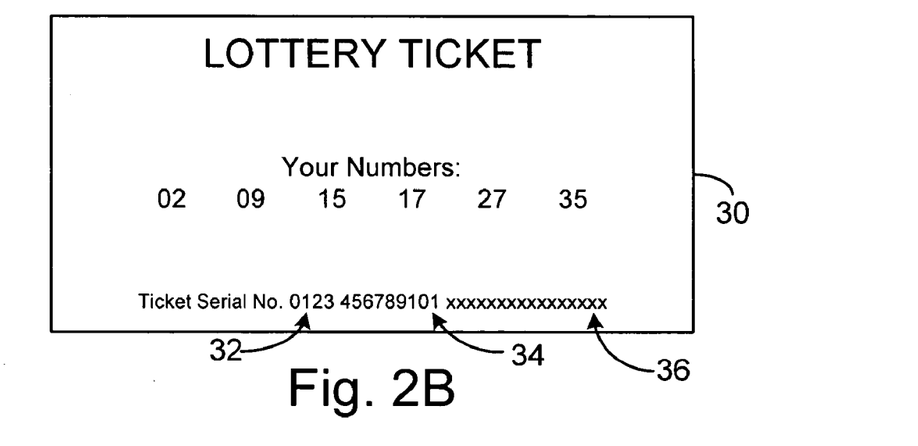
FIG. 2B is a printed on-line lottery ticket similar to FIG. 2A, with the printed serial number including an authentication code portion.
Figure 2C:
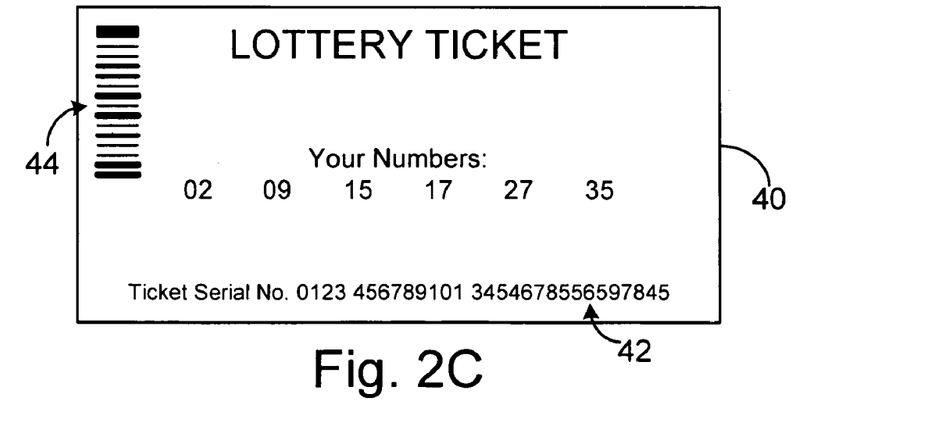
FIG. 2C is a printed on-line lottery ticket similar to FIG. 2B, with the authentication code being a numeric code.

With reference to the drawings in which like numerals represent like elements throughout, FIG. 1 is a diagram of the system 10 for providing an authentication code across a network 14 for use in a document, such as an on-line lottery ticket (FIGS. 2A-2C). One or more ticket-dispensing terminals 16 that each includes a document-printing device 18. Examples of such ticket-dispensing terminals include the Extrema sold by Scientific Games Inc., the T-2000 sold by Sagem, and the Altura sold by GTECH, Inc. The one or more terminals 16 that are in communication with a server 12 across the network 14, in this embodiment, issue printed tickets with serial numbers and authentication codes. More specifically, a keyed cryptographic hash of the bet data is made at the time of the ticket sale by the terminal 16, with the keyed-hash authentication code functioning as a digital signature of the bet data transmitted to the central server 12 at the time of the bet request. The server 12 generates a standard ticket serial number and logs the hash document code along with the bet data and the generated serial number. Once the logging is complete, the server 12 transmits the newly generated serial number to the terminal 16 that generated the request. The terminal 16 proceeds to print the on-line ticket 40 including the received serial number along with the authentication code from the server 12 (and alternately the pseudorandom key that was used to create the hash). In sum, the hashed document code is generated by hashing the clear text bet data with a secret key generated by the terminal 16, and the hash key is not transmitted to the server 12 at the time of the bet request, but rather, the hash key can be printed on the ticket 40 issued, but otherwise is deleted by the terminal 16. Since the terminal 16 deletes the pseudorandom hash key after it has been printed on the ticket 40 and/or used to create a document code sent to the server 12, there is theoretically no way for either the terminal 16 or the server 12 to reproduce the specific hash key use to create the document code.

To provide document security to the printed tickets, the terminal 12 generates and appends an authentication code (e.g., the hash key) to the standard ticket date and serial number at the time of ticket printing The present invention is an alternative to the traditional methods of securing documents, such as on-line lottery tickets, as those shown in FIGS. 2A-2C. FIG. 2A is one embodiment of a printed on-line lottery ticket 20 with the game indicia 22 (typically a series of numbers chosen by the lottery player) and a standard serial number 24 as provided by the central lottery site (here server 12). FIG. 2B is a printed on-line lottery ticket 30 similar to FIG. 2A, with the printed serial number comprised of a four digit date 32, and 10 digit serial number 34 issued from the ticket-provider, and a 16 digit hash key portion 36, which was also provided by the terminal 16.

FIG. 2C is a printed on-line lottery ticket similar to FIG. 2B, with the authentication code 42 being a numeric code. In this embodiment, the numeric code was generated by the terminal 16 by generating a decimal representation of the hash key. The key at the terminal 12 can change for each ticket, and as bet values vary, the authentication code will be pseudorandom at the time of dispensing the lottery ticket.

The lottery authority will only be able to "verify" a signature for a particular lottery terminal 16. In other words, the verifier must have the data for the original document code sent from the terminal 16, which is reproducibly from the authentication code on the printed ticket 20 and use that information to verify the authentication on the ticket 20. In one embodiment, the terminal 16 would hash (mathematical summary) some specific data of the ticket 20, preferably the bet value which will vary per ticket, and can also include such further data as the date 32 and serial number 34, with a local resident key, typically a mathematical value such as a large prime number. Then the key is used to hash and the encrypted hash becomes a document code of the ticket 20. At the other end, the server 12 receives the document code and generates an authentication code to send to the terminal 16 for printing on the ticket 20, which can be solely the ticket serial number, or alternately, a further hashing or other mathematical function of the document code.

While the system 10 is shown as particularly securing a lottery ticket, other documents, such as currency, bonds, instruments, and other printed or remote media can use the present inventive system for security. Furthermore, the authentication code can also be stored in another data format, such as bar code 44, or other one and two dimensional data media. Once the document code is generated, the terminal 16 transmits the document code and other document-specific data, such as bet data, to the server 12. In one embodiment, the server 12 will then generate an authentication code for transmission back to the terminal 12 and printing on the ticket 20. In another embodiment, when the server 12 receives the bet data and hash, it generates an unique serial number, stores the serial number, hash, and bet data, and then transmits the serial number back to the terminal 16. The terminal 16 receives the serial number and prints it along with the bet data and, alternately, the Key to the hash.

The server 12 can then maintain a record of the document code and/or the authentication code for all terminals 16 to be used as a lookup table when a lottery ticket is validated. As is further described in the process of FIG. 6, when a winning lottery ticket was presented by a terminal 16 for validation, preferably the date 32, serial number 34, and authentication code 36 (which can solely be the hash key) are transmitted to the server 12, and the server 12 looks up the terminal 16 that generated the lottery ticket and the authentication code/document code associated with tickets from that terminal 16. In one embodiment, the server 12 decrypts the authentication code 42 to obtain the document code and verifies that the ticket 20 is valid. Thus, if the numbers are identical, the lottery ticket is authentic and was printed at the correct retailer at the correct time. Conversely, if the decrypted authentication code 42 is different than the document code stored for that ticket 20, the lottery ticket is possibly a forgery and the player should be made to go through other methods to receive payment. Of course, further steps of electronic verification of a document could be invoked to verify the lottery ticket after the present inventive method.

In another embodiment, the server 12 uses the transmitted hash key to perform a cryptographic hash of the key and the bet data to verify that the ticket 20 is valid. Thus, if the newly generated hash is identical to the hash that was transmitted to the server 12 at the time of the ticket sale, the lottery ticket is authentic and was printed at the correct retailer at the correct time. Conversely, if the newly generated and stored hashes do not match, the lottery ticket is possibly a forgery and the player should be made to go through other methods to receive payment.

One advantage of utilizing the authentication code to secure the lottery ticket 20, is that the system 10 can be made secure against insider forgeries while still allowing the serial number 24 to remain as clear text at both the ticket provider and on the printed lottery ticket 20. This is opposed to a central server 12 based encryption or keyed-hash scheme which requires that the key be kept secret from all insiders for the system 10 to remain secure. If a pseudorandom key is generated for each ticket, in hashing the bet value, the document code will be fairly random such that a brute force attack decryption will not work.

While the system 10 does require an initial secret key, the security is derived from the authentication code being based upon a mathematical function of the document code. After the document code is made at the terminal 16, the key is changed and no record is kept such that the only way to learn of the document code is to correctly decrypt the authentication code.

Figure 3:
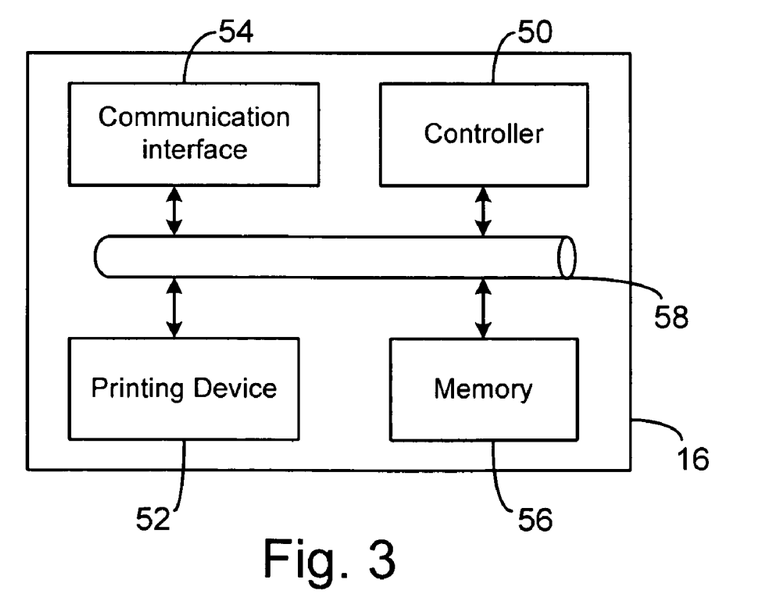
FIG. 3 is a block diagram of one embodiment of a computer platform of the on-line lottery ticket vending terminal.

FIG. 3 is a block diagram of one embodiment of a computer platform of the on-line lottery ticket vending terminal 16. The computer platform includes a document printing device 52 that controls the appropriate printing mechanism to print the on-line lottery ticket 20. A communication interface 54 is also present with a network 14; and a controller 50 and memory 56 that all communicate via a bus 58. In this embodiment, the controller 50 generates a pseudorandom key and selectively receives a bet for entry into a lottery game, and then transmits bet data and a hash via the communications interface 54 to the central server 12 which returns a clear text serial number 26, and then the controller 50 selectively generates a game-entry document, such as a ticket 40, having document-specific information, such as the clear text serial number 26 and the pseudo randomly generated hash key.

Figure 4:
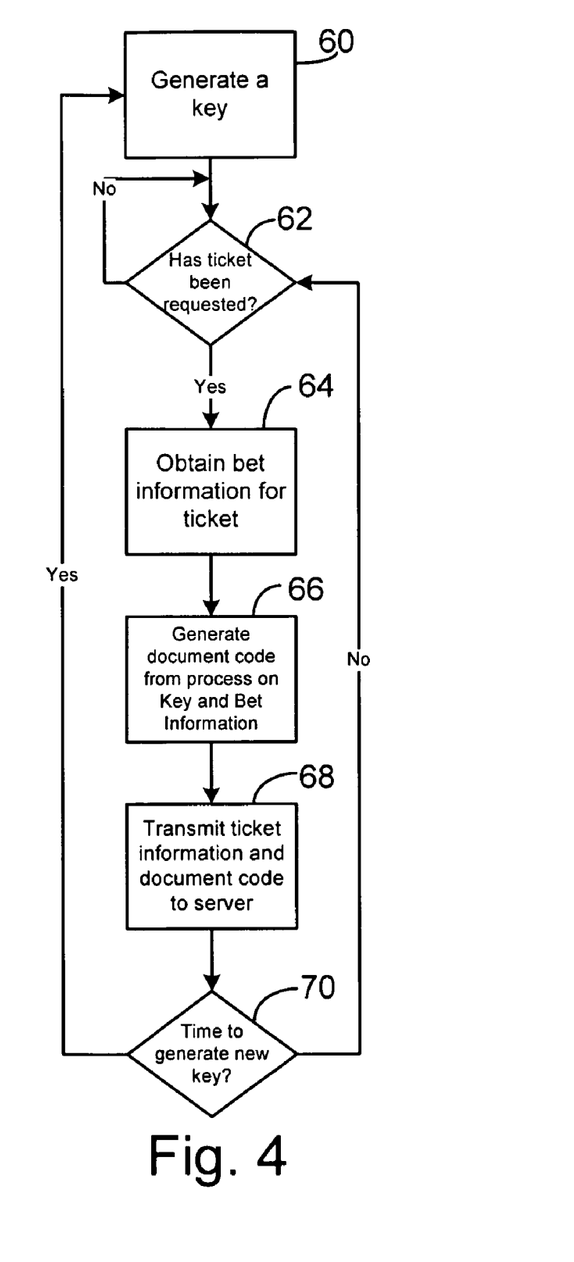
FIG. 4 is a flowchart of one embodiment of a process executing on the on-line lottery ticket vending terminal generating a document code for the lottery ticket based upon a hashing of the key and ticket bet value, and transmitting the document code to the server.

FIG. 4 is a flowchart of one embodiment of a process executing on the on-line lottery ticket vending terminal 16. A key is generated at the terminal 16, as shown at step 60, and a determination is then made as to whether a lottery ticket has been requested for vending from the terminal 16, as shown at decision 62. If a lottery ticket has not been requested to be vended at decision 62, then the process enters a wait state at decision 62 until a lottery ticket is requested vended. If a lottery ticket has been requested to be vended at decision 62, then the bet information is obtained, as shown at step 64, and then terminal 16 generates a document code 66 from the combination of the key and bet value information, as shown at step 66. Then the document-specific information of the bet data and document code is transmitted to the server 12, as shown at step 68. A decision is then made as to whether it is time to generate a new key, as shown at decision 70. If it is time to generate a new key, which can occur as frequently as with each ticket request, then the process returns to step 60 to again generate a key. If a new key is not required at decision 70, then the process returns to decision 62 to determine if a lottery ticket is requested to be vended.

Figure 5:
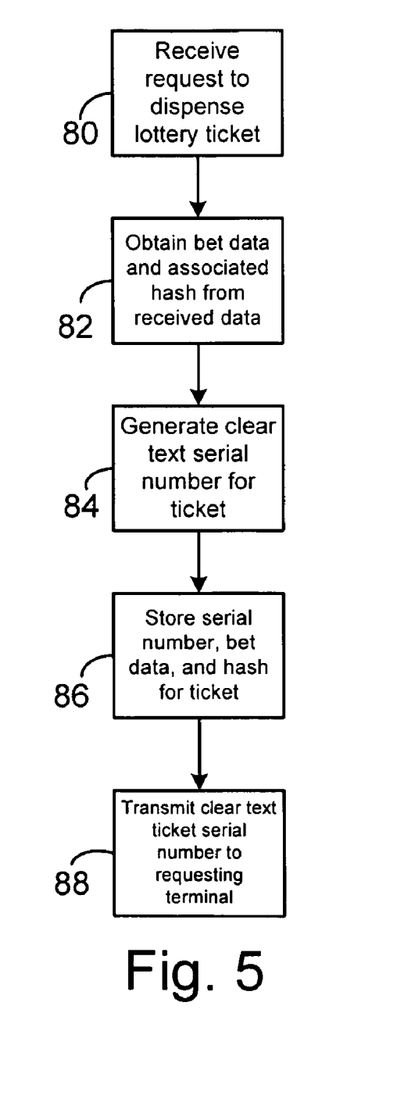
FIG. 5 is a flowchart of one embodiment of a process executing on the ticket-provider server for receiving the document code and other document-specific information, generating an authentication code for the ticket, and then transmitting a ticket serial number and authentication code to a terminal requesting to dispense an on-line lottery ticket.

FIG. 5 is a flowchart of one embodiment of a process executing on the ticket-provider server 12. The server 12 receives a request to dispense a lottery ticket from a terminal 16, as shown at step 80, and then the bet data and associated hash for the bet is obtained from the data, as shown at step 82. The server 12 then generates a clear text serial number, as shown at step 84, and the serial number, bet data, and hash are stored, as shown at step 86. The clear text serial number is then transmitted back to the requesting terminal 16 for inclusion with the printed ticket, as shown at step 88. In this embodiment, the terminal 16, then prints the ticket 30 with the clear text serial number, bet data, and hash key (that was not transmitted to server 12).

Figure 6:
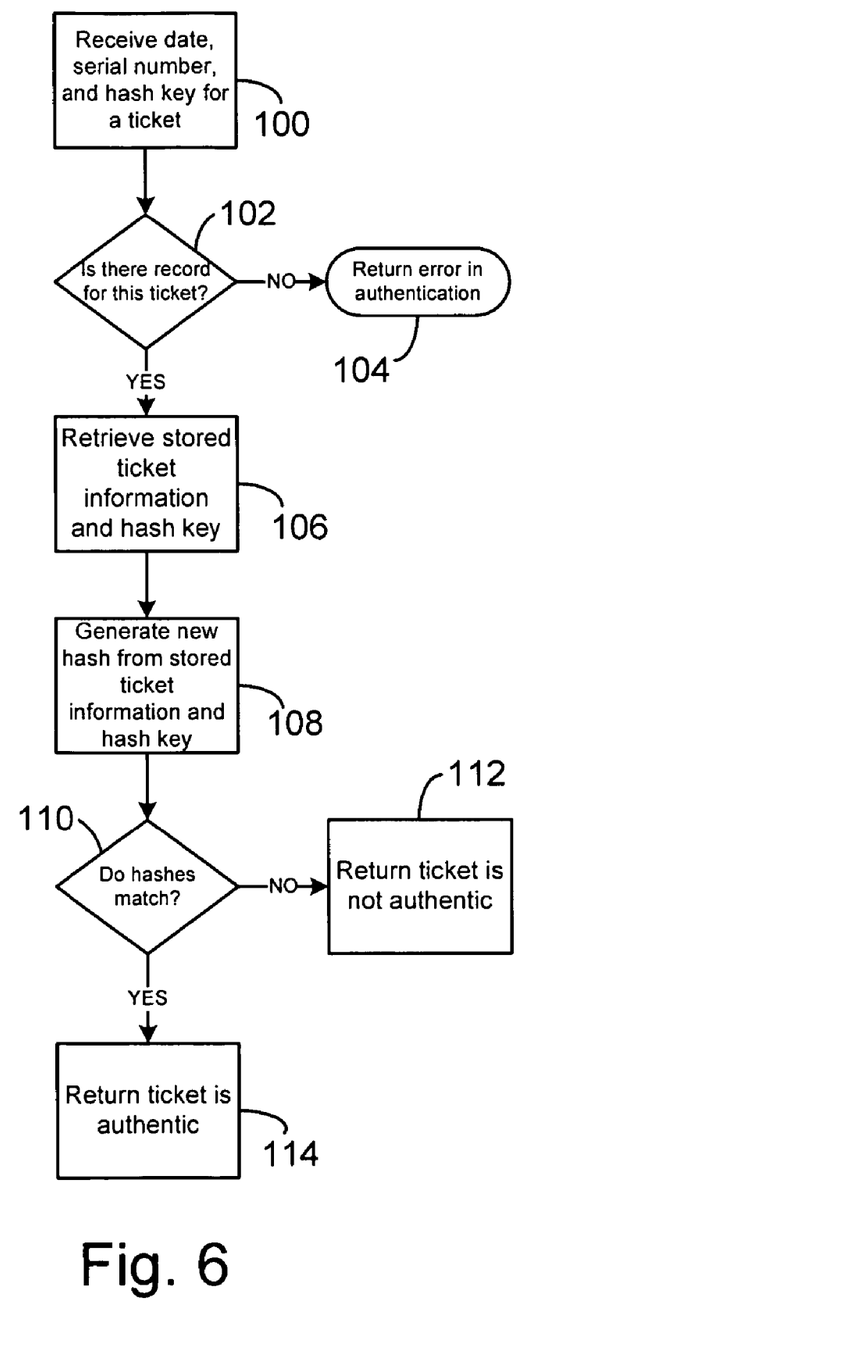
FIG. 6 is a flowchart of one embodiment of a process executing on the ticket-provider server to authenticate a ticket by receiving the ticket authentication code and comparing the authentication code to stored authentication codes.

FIG. 6 is a flowchart of one embodiment of a process executing on the ticket-provider server 12 to authenticate received lottery ticket data. A serial number 34 and date 32 for a lottery ticket 40 are received at the server 12 along with the hash key from the printed ticket 40, as shown at step 100, and then a determination is made as to whether there is a record for the ticket stored, or accessible to the server 12, as shown at decision 102. If there is no record stored at or accessible to the server 12 at decision 102, then an error is output for the lottery ticket authentication process, as shown at error 104. Otherwise, if there is a record for the authentication code for the ticket at decision 102, the stored ticket information and hash are then retrieved by the server 12, as shown at step 106.

The server 12, then uses the received hash key and retrieved stored bet data to generate a new hash as shown in step 108. Then a determination is made as to whether the new hash matches the stored hash, as shown at decision 110. If the hashes do not match at decision 110, then the process returns that the ticket is not authentic, as shown at step 112, and the authentication process ends. Otherwise, if the authentication code matches at decision 108, then the process returns that the ticket is authentic, as shown at step 114, and the authentication process ends. Other data from the ticket could likewise be used in the validation process here, as would be apparent to one of skill in the art. In one embodiment, the authentication code 42 can be generated by asymmetrically encrypting document code, and the ticket is then validated by confirming that the associated authentication code decrypts to the received document code.

Because the pseudorandom nature of the key generation at the terminal 16, the hash keys, or other authentication codes, stored at the server 12 can be audited to ensure that the randomness is maintained and thus, that the security of the encryptions of the authentication codes is high. Since in the system 10, the server 12 is required to maintain a database of all authentication codes, the database can be audited with the assurance that the terminal 16 is truly selecting pseudorandom keys. For audit purposes, the authentication code database can be assumed to be random and therefore secure if it passes two general tests: (1) It appears random; and (2) it is unpredictable. It must be computationally infeasible to predict what the next authentication code will be for a given document code.

To ensure randomness, there are automated tests that a third party (e.g., a Lottery authority) can perform to ensure that the second (hash or public) key database is random. One test is to determine if the distribution of "1s" and "0s" throughout the second (hash or public) key database is approximately even. Further, approximately half of the runs (sequences of the same bit) should be of length one, one quarter of length two, one eight of length three, and so on. Also, the distribution of run lengths for "1s" and "0s" should be about the same. Finally, when an off-the-shelf loss-less compression algorithm is applied to the database of second (hash and public) keys the compression level should not exceed 25%. All of the above properties can then be quantified with their output applied to a "chi-squared" test, which is a mathematical test known in the art to measure deviation of a sample from expectation, to ensure the randomness of the second key database.

To ensure unpredictability, an auditor can be reasonably assured that the sequence of public keys is unpredictable by simply scanning multiple databases for repeated keys or sequences of keys. While some small number of key repetitions can be possible, a chi-squared test would reveal if a level of repetition were excessive.

While there has been shown a preferred and alternate embodiments of the present invention, it is to be appreciated that certain changes may be made in the form and arrangement of the elements, and steps of the methods without departing from the underlying spirit and scope of the invention as is set forth in the Claims. Furthermore, although elements of the invention may be described or claimed in the singular, the plural is contemplated unless limitation to the singular is explicitly stated.

What is claimed is:

1. A system for providing an authentication code across a network for use in a game document comprising:
    one or more terminals that each include a document printing device, each terminal including a pseudo-random key generator configured to generate a key wherein the key remains at the terminal that generated the key and is not disclosed to the remainder of the network, each terminal configured for selectively receiving a bet for entry into a game and generating a game-entry document having document-specific information, each terminal further configured for generating a document code comprised of a mathematical function utilizing at least the key and a bet for a specific game entry, and each terminal configured for selectively transmitting the document-specific information and document code to another computer device on the network;
    at least one server in communication with the network, the server configured for receiving the document-specific information and document code transmitted from the one or more terminals, storing such document-specific information and code, and sending the one or more terminals an authentication code comprising at least a serial number for printing on a game document; and
    wherein upon receipt of the authentication code from the at least one server, each terminal configured for printing a game document including the received authentication code and deleting the key so that it no longer remains at each terminal so that neither the terminal or the server may reproduce the key.

2. The system of claim 1, wherein the game document is a lottery ticket.

3. The system of claim 1, wherein the document code is comprised of a mathematical function that further utilizes the document-specific information.

4. The system of claim 1, wherein the document-specific information is a ticket serial number.

5. The system of claim 1, wherein the mathematical function is a hashing function.

6. The system of claim 1, wherein terminal changes the key for each game-entry document printed.

7. The system of claim 1, wherein the authentication code is comprised of a further mathematical function performed on the received document code.

8. A method of providing an authentication code across a network for use in the verification of a game document, comprising:
    receiving a bet at a terminal for entry into a game, wherein the terminal includes a pseudo-random key generator that generates a key wherein the key remains at the terminal that generated the key and is not disclosed to the remainder of the network;
    transmitting document-specific information and a document code from the terminal across a network, the document code comprising a mathematical function utilizing at least the key and the bet for the specific game entry;
    receiving at a server the document-specific information and the document code transmitted from the terminal across the network;
    storing such document-specific information and document code at the server;
    generating an authentication code at the server comprising a serial number;
    sending to the terminal at least the authentication code for generation of a game document;
    generating a game document at the terminal having document-specific information and the authentication code; and
    deleting the key at the terminal so that it no longer remains at the terminal so that neither the terminal nor the server may reproduce the key.

9. The method of claim 8, further comprising the steps of:
receiving an authentication code at the server;
comparing the authentication code to stored document-specific information and document codes to indicate if the authentication code is valid.

10. The method of claim 9, wherein the step of comparing the authentication code compares the authentication code received with the stored document-specific information and document code received from a specific terminal.

11. The method of claim 8, wherein the step of generating an authentication code is comprised of a mathematical function performed on the received document code.

12. The method of claim 11, wherein the step of generating an authentication code is comprised of a hashing function performed on the received document code.

13. The method of claim 8, wherein the step of generating an authentication code is comprised of a mathematical function performed on the received document-specific information and document code.

14. A computer device for generating game-entry documents, comprising:
a document printing device;
a communication interface with a network; and
a controller including a pseudo-random key generator configured to generate a key wherein the key remains at the controller that generated the key and is not disclosed to the remainder of the network, the controller configured for selectively receiving a bet for entry into a game and selectively generating a game-entry document having document-specific information, the controller further configured for generating a document code comprised of a mathematical function utilizing at least the key and the bet for a specific game entry, the controller further configured for selectively transmitting the document specific information and document code to another computer device on the network, and the controller further configured for selectively receiving an authentication code from another computer device on the network; and
wherein the document printing device is configured to print a game-entry document including the received authentication code and the controller is configured to delete the key so that it no longer remains at the controller such that neither the controller nor the computer device may reproduce the key.

15. The device of claim 14, wherein the document code is comprised of a mathematical function that further utilizes the document-specific information.

16. The device of claim 15, wherein controller changes the key for each game document printed.

17. The device of claim 14, wherein the game document is a lottery ticket.

18. The device of claim 17, wherein the document-specific information is a ticket serial number.

19. The device of claim 14, wherein the mathematical function is a hashing function.

20. The device of claim 14 wherein the mathematical function is an asymmetrical encryption algorithm.

* * * * *